United States Patent [19]

Barlow

[11] Patent Number: 4,929,046

[45] Date of Patent: May 29, 1990

[54] REMATEABLE FIBER OPTIC SPLICE

[76] Inventor: Robert W. Barlow, P.O. Box 133, Canton, Pa. 17724

[21] Appl. No.: 305,350

[22] Filed: Feb. 1, 1989

[51] Int. Cl.$^5$ .............................................. G02B 6/38
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 3,579,316 | 11/1968 | Dyott et al. | 350/96.21 |
| 3,734,594 | 5/1973 | Trambarulo | 350/96.21 |
| 3,825,319 | 7/1974 | Cook et al. | 350/96.21 |
| 3,861,781 | 1/1975 | Hasegawa et al. | 350/96.21 |
| 3,870,395 | 3/1975 | Schicketanz | 350/96.21 |
| 3,919,037 | 11/1975 | Miller | 156/502 |
| 3,944,328 | 3/1976 | Kent et al. | 350/96.21 |
| 4,061,416 | 12/1977 | Stewart | 350/96.21 |
| 4,107,242 | 8/1978 | Runge | 264/1 |
| 4,118,618 | 10/1978 | Gauthier et al. | 219/121 P |
| 4,142,776 | 3/1979 | Cherin et al. | 350/96.21 |
| 4,166,668 | 9/1979 | MacLeod | 350/96.20 |
| 4,186,998 | 2/1980 | Holzman | 350/96.21 |
| 4,257,674 | 3/1981 | Griffin et al. | 350/96.21 |
| 4,548,467 | 10/1985 | Stoerk et al. | 350/96.21 |
| 4,573,760 | 3/1986 | Fan et al. | 350/96.21 |
| 4,707,068 | 11/1987 | Moulin | 350/96.21 |
| 4,755,018 | 7/1988 | Heng et al. | 350/96.21 |
| 4,787,701 | 11/1988 | Stenger et al. | 350/96.21 |
| 4,787,704 | 11/1988 | Knecht et al. | 350/96.21 |

OTHER PUBLICATIONS

Connectors, special report, pp. 25-33.

Primary Examiner—Frank Gonzalez
Attorney, Agent, or Firm—William H. McNeill

[57] ABSTRACT

A fiber optic, remateable splice assembly comprises an elongated housing; a flexible, fiber receiving and positioning unit centrally located within said housing; first and second removable ferrules, one within each end of said housing; and holding means associated with said housing for releasably maintaining said ferrules within said housing.

5 Claims, 1 Drawing Sheet

REMATEABLE FIBER OPTIC SPLICE

TECHNICAL FIELD

This invention relates to fiber optic splices and more particularly to field installable remateable splices.

BACKGROUND ART

The joining of optical fibers for use in transmission lines frequently requires the use of a splice. Common techniques employed in the industry include mechanical splices as exemplified in U.S. Pat. No. 4,257,674, and Ser. No. 413,856, filed Sept. 1, 1982, both being assigned to the assignee of the instant invention: fusion splicing, which literally involves melting the fibers to be joined together until they fuse, as shown, e.g., in U.S. Pat. No. 4,118,618; and connectorization, as shown, e.g.,in the following U.S. Pat. Nos.: 3,579,316; 3,734,594; 3,825,319; 3,861,781; 3,870,395; 3,919,037; 3,944,328; 4,061,416; 4,107,242; 4,166,668; 4,186,998; 4,787,704. Also known are commercially available connectors such as the FC; BICONIC; SMA 905 and 906; ST*; D4; and FC-PC. (*Note; ST is a registered trademark of AT&T).

The typical mechanical splice is not reuseable since its employment requires that the fiber be cemented therein, usually by the use of an optical adhesive. Fusion splicing is expensive and time consuming and is generally not suited for emergency field use. The connector approach is well suited for joining fibers to equipment which has mating terminals but is also not suited for emergency repairs. The remateable splice shown in U.S. Pat. No. 4,787,704 is complex and expensive.

SUMMARY OF THE INVENTION

Therefore, it is an object of the invention to obviate the disadvantages of the prior art.

It is another object of the invention to enhance fiber optic splices.

Yet another object of the invention is the provision of an economical, remateable splice.

These objects are accomplished, in one aspect of the invention, by the provision of a fiber optic, remateable splice assembly which comprises an elongated housing having a flexible, fiber receiving and positioning unit centrally located therewithin. First and second removable ferrules are positioned in the housing, one within each end. Holding means are associated with the housing for releasably maintaining the ferrules.

The splice is comsummated by : fixing a flexible fiber receiving and positioning unit centrally within an elongated housing having two ends; removably fixing a ferrule in each of said housing ends; inserting a fiber optic cable having at least a portion of its optical fiber extending therefrom into the longitudinal bore formed in each of said ferrules until said portions of said optical fibers meet within the longitudinal bore formed within said centrally located fiber receiving unit to consummate said splice; and permanently fixing said cables to said ferrules.

This remateable splice is simple and economical to manufacture and is extremely easy to use for emergency repairs in the field.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
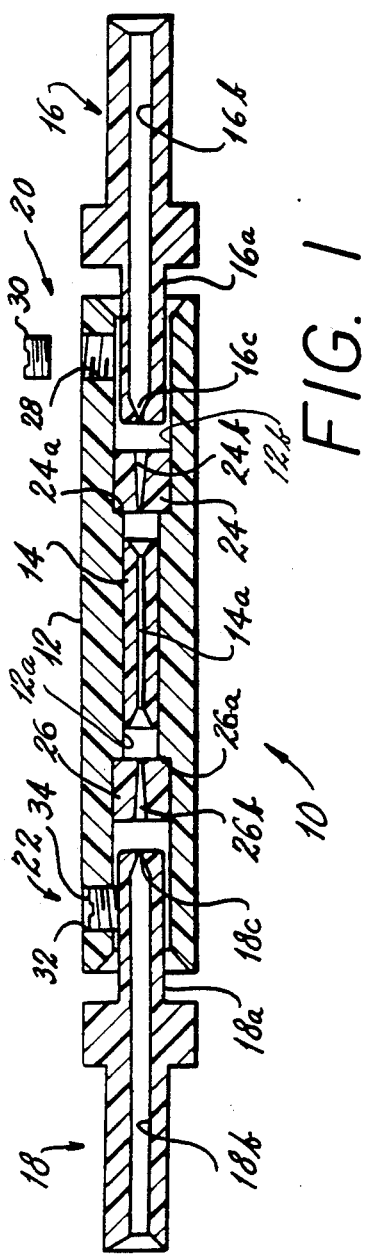
FIG. 1 is an elevational sectional view of the housing for the splice.
Figure 2:
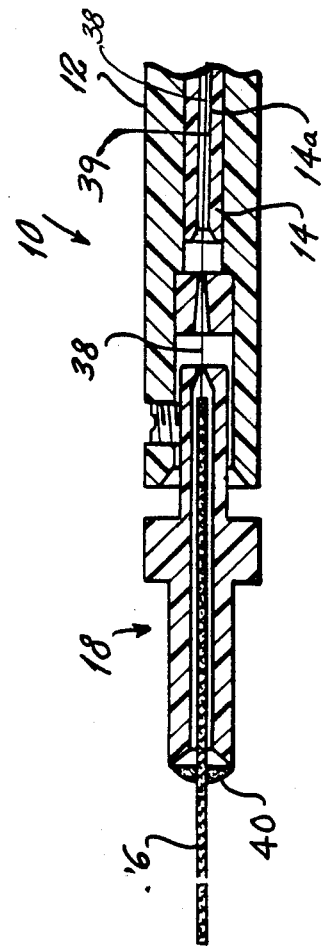
FIG. 2 is a partial, similar view, with a consummated splice.

Referring now to the drawings with greater particularity, there is shown if FIG. 1 a fiber optic remateable splice assemby 10 having an elongated, cylindrical housing 12 having a first inside diameter 12a substantially in the center and a second diameter 12b, larger than the first, at each end. A flexible, fiber receiving and positioning member 14 is centrally located within housing 12. Preferrably, the receiving member is a pair of elastomeric parts of the kind shown in U.S. Pat. No. 4,257,674.

Inserts 24 and 26 repectively, are positioned in the ends of housing 12. The inserts have a diameter substantially equal to the larger diameter and butt against shoulders 24a and 26a respectively. Each of the inserts has a funnel-shaped bore (24b and 26b) coincident with the longitudinal axis of the inserts and in alignment with the longitudindal receiving bore 14a, which can be a V groove, in positioning member 14.

First and second ferrules 16 and 18 have first ends 16a and 18a, which ends have an outside diameter substantially equal to the larger inside diameter of housing 12. The ferrules have a dual diameter longitudinal bore, the first portions, 16b and 18b, being dimensioned to receive a fiber optic cable, i.e., an optical fiber having its protective coating thereon, and second portions, 16c and 18c, dimensioned to receive the stripped optical fiber. Holding means 20 and 22 are positioned adjacent the ends of the housing 12 for releasably grasping the ferrules 16 and 18 respectively. In the embodiment shown the holding means 20 comprises threaded opening 28 and set screw 30, and holding means 22 comprises threaded opening 32 and set screw 34.

The splice is consummated by providing a housing 12 with a centrally located fiber receiving unit 14 and inserts 24 and 26 positioned therein. Ferrules 16 and 18 have their first ends 16a and 18a inserted into housing 12 and set screws 30 and 34 are tightened to hold them in place. Fiber optic cables 36, having a portion of their insulation removed to reveal optical fiber 34, are inserted into the longitudinal bores 16b and 18b, respectively, until the free ends of the optical fibers 38 meet, substantially in the center of positioning unit 14, as shown at 39. Thereupon, the fiber optic cables 36 are fixed in position, e.g., by the application of cement 40 to the cable and the outside area of the ferrules 16 and 18. When the cement 40 dries, the set screws 30 and 34 can be loosened and the cables 36 withdrawn from the housing 12. Since the appropriate distance has been set and fixed by the cable being cemented to the ferrules, the splice can be remated and the fibers will resume the same relative position within housing 12 as they had before.

There is thus provided by this invention a simple and economical, remateable splice having unmatched ease of assembly in field installation, even under adverse conditions.

While there have been shown and described what are at present considered to be the preferred embodiments of the invention, it will be apparent to those skilled in the art that various changes and modifications can be made herein without departing from the scope of the invention as defined by the appended claims.

I claim:

1. A fiber optic, remateable splice assembly comprising: an elongated housing; a flexible, fiber receiving and positioning unit centrally located within said housing; first and second slidably removable, cylindrical ferrules, one within each end of said housing; and holding means associated with said housing for releasably maintaining said ferrules within said housing, said cylindrical ferrules being rotatable within said elongated housing when said holding means are disengaged, said rotation having no effect upon the transverse placement of said ferrules within said ends.

2. The splice assembly of claim 1 wherein an insert is positioned between said centrally located positioning unit and the interior end of first and second said ferrule.

3. The splice assembly of claim 2 wherein said holding means comprises a threaded aperture and a set screw therefor, each of said set screws engaging one of said ferrules.

4. A method of making a remateable splice comprising the steps of: fixing a flexible fiber receiving and positioning unit centrally within an elongated housing having two ends; removably fixing a ferrule in each of said housing ends; inserting a fiber optic cable having at least a portion of its optical fiber extending therefrom into the longitudinal bore formed in each of said ferrules until said portions of said optical fibers meet within the longitudinal bore formed within said centrally located fiber receiving unit to consummate said splice; and permenently fixing said cables to said ferrules.

5. The method of claim 4 wherein a pair of inserts each of which has a longitudinal bore is positioned within said housing, one on either side of fiber receiving unit and between said unit and the interior end of said ferrules.

* * * * *